Jan. 29, 1952        I. KENIS        2,583,855
ZINCILATE IMPREGNATED FIBER GLASS
Filed March 22, 1948
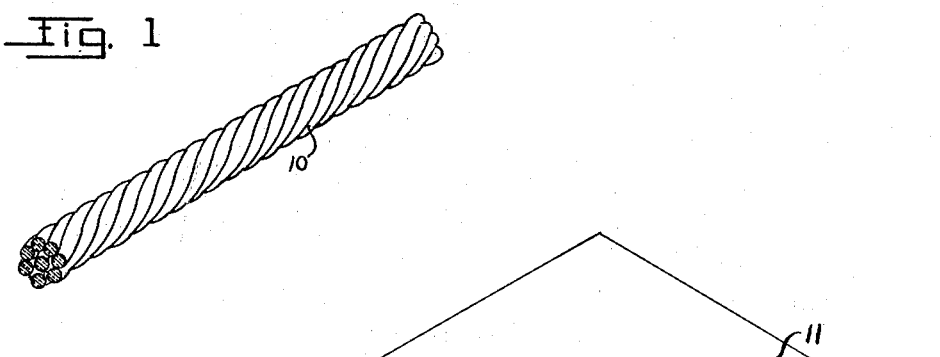
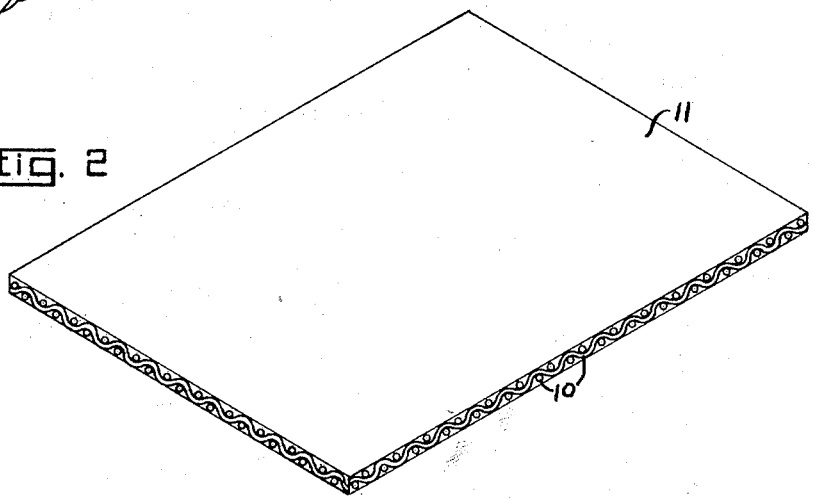
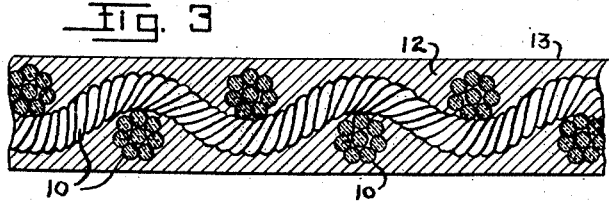
INVENTOR
IVAN KENIS
BY
*Toulmin & Toulmin*
ATTORNEYS Patented Jan. 29, 1952

2,583,855

UNITED STATES PATENT OFFICE 2,583,855

ZINCILATE IMPREGNATED FIBER GLASS

Ivan Kenis, Dayton, Ohio, assignor to Industrial Metal Protectives, Inc., Wilmington, Del., a corporation of Delaware Application March 22, 1948, Serial No. 16,292

3 Claims. (Cl. 117—126)

The present invention is concerned with fiber glass and deals primarily with the provision of a new and effective protective coating for the fiber glass.

At the present time, it is common practice to form yarns from glass fibers and fashion these yarns into a finished fabric or other article. In many fields of usage, these articles which are made from glass fibers are not subjected to abrasive influences. On the other hand, many fields in which attempt has been made to use glass fibers subject the glass fiber articles to abrasive influences with a highly deleterious and damaging result. Because of this inability of glass fibers to resist abrasion, it has been proposed to impregnate the fibers with various plastics. However, the materials so far applied for this purpose have not afforded the desired results.

One example of a case in which fiber glass which had been impregnated with a plastic has failed to meet the conditions of service usage is in the wing assemblies of aircraft. Such wing assemblies are exposed to excessive abrasion effects, particularly when the aircraft is in flight, and in the tests so far conducted, the glass fiber parts impregnated with the plastic have not withstood the service conditions.

There has recently become available to the public a coating material which is designed primarily for use with zinc and iron and which consists essentially of finely comminuted zinc or other metals that is suspended in sodium silicate. Such a coating composition is illustrated and described in the application of Alexander McDonald, Serial No. 709,770, filed November 14, 1946, now U. S. Patent No. 2,509,875, and entitled "Improvements in and Relating to Coating Compositions."

With the foregoing background in mind, the present invention has in view as its foremost objective, the provision of a composite article comprising fiber glass that is impregnated with a coating composition consisting of finely comminuted metal suspended in sodium silicate and particularly a coating composition of the type described in the above identified copending application.

When an article made from glass fibers is impregnated with a coating composition of this type, a very effective bond is established due to the fact that the coating composition thoroughly fills the interstices between the fibers. This impregnation takes place while the coating is applied in a liquid state and after the coating has been set as by heating, a thorough interlock is established.

Moreover, the coating which has been applied to the fibers provides the high abrasive resistant qualities which are so necessary for many uses to which this fiber glass article is meant to be put. While the articles which are fashioned from yarns of glass fibers may be fairly rigid, they generally have the property of flexibility to at least some small degree. However, when the coating is applied thereto in accordance with the teachings of this invention, the articles are rendered substantially rigid, at least to the extent sufficient to maintain the coating intact and not subject to cracking.

Another important phase of the present invention is the provision of a new and improved method for applying a protective coating to articles made of glass fibers. This method consists essentially of applying a coating material of the type above noted while in liquid form to the article of glass fibers so as to thoroughly impregnate the interstices between the fibers and then setting said coating as by heating.

Various other more detailed objects and advantages of the invention such as arise in connection with carrying out the above noted ideas in a practical embodiment will in part become apparent and in part be hereinafter stated as the description of the invention proceeds.

The invention therefore comprises a composite article consisting of woven glass fibers that are impregnated and covered by a protective coating consisting essentially of finely comminuted metal suspended in sodium silicate, together with the method of applying said coating to said glass fibers.

For a full and more complete understanding of the invention, reference may be had to the following description and accompanying drawings wherein:

Figure 1 is a view of a yarn which is made of glass fibers.

Figure 2 is a perspective view showing a piece of fabric or comparable material that is woven from the yarns of Figure 1.

Figure 3 is a cross-sectional view, taken on an enlarged scale, showing the coating material as applied to the glass fibers.

Referring now to the drawings wherein like reference characters denote corresponding parts and first more particularly to Figure 1, a yarn is depicted therein and identified by the reference character 10. This yarn is made of glass fibers which are twisted in the yarn construction in a manner well-known in this art.

Figure 2 discloses a piece 11 which is made by weaving a plurality of the yarns 10 into the construction illustrated. Obviously, other textile operations besides weaving may be employed to achieve the desired construction of the textile yarn. The important fact is that the article 11 is made up of yarns that are fashioned from glass fibers.

It is the article 11 which is to be covered and protected by the coating composition in accordance with the teachings of this invention.

Before describing the exact steps which are used to apply the coating to the article 11, attention is called to the nature of the coating material which is to be employed.

Such a coating material consists essentially of a finely divided or comminuted metal, such as zinc, lead, aluminum, or alloys thereof. This finely divided material is combined with sodium silicate in which the ratio of sodium oxide to silica is approximately 1:2.6. This composition is essentially a suspension.

If desired, certain lead compounds may be added to this basic composition to incorporate desirable properties thereinto. Thus, if red lead be added, the attack of zinc by the alkalide is delayed. Other lead compounds which may be added are lead chromate, litharge, and white lead. In all cases the metallic dust which is employed in the basic composition must be finely comminuted, the average particle size should be no greater than three microns. This feature of the fine nature of the particles is highly important, as it is believed that many of the desirable properties of the coating are derived from this factor. Following are given a few examples of a coating material which is suitable to the method and products of the present invention.

Example I

| | |
|---|---|
| Sodium silicate of ratio $Na_2O:SiO_2$ of 1:2.6 milliliters__ | 30 |
| Zinc dust _____grammes__ | 100 |

Example II

| | |
|---|---|
| Red lead _____ozs.__ | 8 |
| Lead chromate _____ozs.__ | 4 |
| Sodium silicate of ratio $Na_2O:SiO_2$ of 1:2.6 pts.__ | 6 |
| Mix thoroughly and add: Superfine zinc powder _____lbs.__ | 21 |

This mixture will yield approximately one gallon of the coating composition according to the invention.

The mix is brushed or sprayed onto the surface to be protected, and is allowed to dry for 2 hours. It is then raised, preferably in a substantially moisture-free atmosphere, to a temperature of 200-300° F.

It is important that for thick iron sections the baking operation should take place in a moisture-free atmosphere. In the case of thin iron sections, this condition is not so important, however.

If, in the above mentioned example, zinc dust is used having a particle size larger than 3 microns, say for instance 6 microns, satisfactory results can still be obtained with the ratio of $Na_2O:SiO_2$ of from 1:2.3 to 1:3.0 if the quantity of the zinc dust in the mixture is increased.

In this connection a mixture of the following constitution and in the following proportions may be used:

Example III

| | |
|---|---|
| Red lead _____grammes__ | 7 |
| Lead chromate _____do____ | 5 |
| Zinc dust _____do____ | 163 |
| Sodium silicate having the ratio of $Na_2O:SiO_2$ of from 1:2.3 to 1:3.0 _____milliliters__ | 31 |

A particularly advantageous composition will be obtained when of the metal dust, having an average particle size of not more than 3 microns, at least 90 per cent is capable of passing through a 400 mesh Tyler sieve. A composition made up with such metal dust is distinguished by an especially great adhesion and will allow bending of the coating article to a greater degree than has heretofore been possible without destroying or affecting the coating.

While the compositions have been described above in connection with sodium silicate, it has been found that satisfactory results will also be obtained when replacing some or all of the sodium silicate by potassium silicate.

While in the above mentioned Examples II and III the percentage of lead chromate is given with the understanding that the lead chromate is in the form of dry powder, it is of course understood that, if desired, lead chromate may also be used as a paste containing 50 per cent by weight of water. In this last mentioned instance twice the weight will be required.

A protective coating against sulphuric acid may be provided for steel by first coating the steel with a sodium silicate zinc dust composition according to this invention and subsequently superimposing another coating comprising a composition of sodium silicate and lead dust upon the said first coating.

It has also been found that a coating according to the invention will especially firmly adhere to a surface to be coated when this surface is subjected first to a treatment with an acid bath, whereupon the surface is thoroughly washed to remove all acid residues, and then this surface is subjected to sand blasting.

In order to apply a coating composition to the article 11, it is of course necessary that the latter be thoroughly cleansed. This cleansing may be achieved by first subjecting the surface which is to be treated to an acid bath whereupon the surface is thoroughly washed to remove all acid residues and, as a final cleansing step, sand blasting may be employed.

The coating composition is now applied in a preferred manner such as by dipping, the use of an implement such as a brush, or spraying. This coating is depicted at 12 in Figure 3 and is shown as thoroughly filling the interstices of the fibers making up the yarn 10 and the spacing therebetween. Thus there is a thorough impregnation of the surface of the article 11 which is being treated. After the coating 12 has been applied, it is necessary that it be set. This is perfectly carried out by heating. Factors that enter into this setting by heating may vary according to the conditions of the particular job. However, it is noted that the time period of from a few minutes to one hour may be employed with a temperature of about 250° Fahrenheit. As the coating is set, it is thoroughly interlocked in the interstices of the fibers so as to provide an effective bond between the coating 12 and the article 11. The surface of the coated article which is designated 13 is one which will afford good resistance to any abrasive effects or influences to which the article is subjected. Thus the ultimate result is that we have a fiber glass product which is capable of withstanding abrasive influences to a degree heretofore unapproached in this field.

While a preferred specific embodiment of the invention is hereinbefore set forth, it is to be clearly understood that the invention is not to be limited to the exact methods and materials illustrated and described because various modifications of these details may be provided in putting the invention into practice within the purview of the appended claims.

What is claimed is:

1. The method of protecting a textile article of glass fibers from abrasive influences consisting of applying a coating composition to said article, which composition consists of at least one finely comminuted metal having a particle size at least 90% of which is less than 6 microns selected from the group consisting of zinc, lead and aluminum, suspended in a sodium silicate solution having the ratio of $Na_2O:SiO_2$ defined in moles of from 1:2.3 to 1:3, and drying the composition.

2. As an article of manufacture, a fabric containing twisted glass fibers impregnated with a composition so as to fill the interstices between the fibers comprising a dispersion of zinc dust, the particle size of which is not over 6 microns and having an average particle size of 3 microns, suspended in set sodium silicate in the ratio of about 1:2.0 to 1:3.0.

3. The method of making a fabric composed of twisted glass fibers free from abrasive influences consisting of applying a coating composition to said twisted glass fibers, said composition consisting of a finely divided zinc dust, the particle size of which is not over 6 microns and having an average particle size of 3 microns, suspended in set sodium silicate, the ratio of which is about 1:2.0 to 1:3.0.

IVAN KENIS.

REFERENCES CITED

The following references are of record in the file of this patent:

UNITED STATES PATENTS

| Number | Name | Date |
| --- | --- | --- |
| 741,592 | Roberts | Oct. 13, 1903 |
| 2,046,494 | Van Rolleghem | July 7, 1936 |
| 2,199,087 | Drill et al. | Apr. 30, 1940 |
| 2,230,272 | Slayter | Feb. 4, 1941 |
| 2,264,189 | Richter et al. | Nov. 25, 1941 |
| 2,343,180 | Hehn | Feb. 29, 1944 |
| 2,509,875 | McDonald | May 30, 1950 |

FOREIGN PATENTS

| Number | Country | Date |
| --- | --- | --- |
| 104,231 | Australia | June 14, 1938 |